United States Patent [19]

Stevenson et al.

[11] 4,178,326

[45] Dec. 11, 1979

[54] LOW-SHRINK THERMOSETTING POLYESTERS

[75] Inventors: Donald R. Stevenson, Dover; David A. Schmidt, Lorain, both of Ohio

[73] Assignee: Owens-Corning Fiberglas Corporation, Toledo, Ohio

[21] Appl. No.: 851,085

[22] Filed: Nov. 14, 1977

[51] Int. Cl.$^2$ .................... C08L 67/06; C08L 75/06
[52] U.S. Cl. ............................ 525/176; 525/78; 525/272; 525/243; 525/233
[58] Field of Search ............... 260/862, 876 R, 881, 260/901, 873, 879, 885, 886

[56] References Cited

U.S. PATENT DOCUMENTS

| | | | |
|---|---|---|---|
| 3,883,612 | 5/1975 | Pratt et al. | 260/862 |
| 4,048,257 | 9/1977 | Stevenson | 260/862 |
| 4,051,085 | 9/1977 | Hess et al. | 260/862 X |

*Primary Examiner*—Thomas DeBenedictis
*Attorney, Agent, or Firm*—Ronald C. Hudgens; James B. Wilkens

[57] ABSTRACT

This invention pertains to low-shrink polyester molding resin mixtures primarily based on a certain low-shrink thermoplastic additive produced by synthesizing the vinyl copolymer thermoplastic additive in a hydroxyl terminated polymeric diluent. The resulting vinyl copolymer is dispersed in the hydroxyl containing polymeric diluent which can be post reacted with isocyanate material to produce a polyurethane-vinyl copolymer thermoplastic additive. This thermoplastic additive can be added directly to the thermosetting polyester polymer and monomer mixture to provide a low-shrink molding resin system.

12 Claims, No Drawings

LOW-SHRINK THERMOSETTING POLYESTERS

BACKGROUND OF THE INVENTION

Unsaturated thermosetting polyester polymers blended with vinyl monomers are well-known molding resins that may be cured under heat and/or pressure to cross-link the vinyl monomer with the unsaturated polyester and form a thermoset plastic molded part. Molding resins often include inert fillers, glass fibers, glass flakes, talcs, and the like for the purpose of obtaining improved impact strength, flexural strength, and rigidity in the molded parts.

A rapidly expanding interest in thermoset molding resin compositions has been generated by the automotive market wherein molding compositions are being utilized for preparing automobile bodies and accessories such as, for example, grill and headlamp housings, fender extensions, and hood scoops. Most conventional thermosetting polyester resins, however, characteristically shrink about 8 to 10% by volume and distort during the press molding process and thus are unsatisfactory despite the many favorable characteristics inherent in polyester molding compositions.

Commonly assigned U.S. Pat. No. 3,883,612 discloses an excellent low-shrink thermosetting polyester resin system based primarily upon a certain dicyclopentadiene-modified thermosetting polyester polymer in combination with a thermoplastic copolymer as a thermoplastic additive. This resin composition provides a uniform stabilized resin mixture adapted to cross-link the unsaturated monomer with the unsaturated thermosetting polyester to form a uniform solid thermoset structure exhibiting excellent low-profile characteristics. Thermoplastic additives for low-shrink thermosetting resin mixtures are often produced by suspension or latex polymerization processes wherein ethylenically unsaturated monomers are copolymerized in an aqueous medium to produce water dispersed polymers. For instance, Example II of U.S. Pat. No. 3,883,612 discloses ethylenically unsaturated monomers polymerized in water to produce thermoplastic suspension polymer particles suspended in water. The polymer particles are then separated from the water by centrifuging and any residual water can be removed by drying and/or vacuum stripping in the presence of styrene. The dried thermoplastic polymer particles are then mixed with styrene and thermosetting polyester to produce a stabilized low-shrink molding resin mixture. Other similar procedures have been suggested wherein the polymerizing medium is an inert organic solvent such as xylene whereupon the inert solvent is subsequently removed. Although the use of water or organic solvent as a polymerizing medium provides good control over the polymerization process, such processes necessitate the removal of the water or organic solvent prior to mixing the thermoplastic polymer particles with the thermosetting polyester and monomer to form the low-shrink thermosetting resin system.

It now has been discovered that thermoplastic polymer additives for use in low-shrink thermosetting molding resin systems can be efficiently produced by copolymerizing ethylenically unsatural monomers within hydroxy terminated low molecular weight polymeric diluent non-reactive with said monomers and subsequently reacting the hydroxyl containing polymeric diluent with an isocyanate to form a polyurethane copolymer. Use of a polymeric diluent provides a suitable polymerizing medium for the vinyl copolymer and further eliminates the process step of removing the water or solvent polymerizing medium. The process is particularly remarkable in that the resulting vinyl copolymer dispersed in the polymeric diluent can be further reacted with isocyanate whereby the resulting polyurethane-vinyl copolymer mixture can be directly utilized in thermosetting polyester resins to produce an excellent low-shrink molding resin system.

SUMMARY OF THE INVENTION

Briefly, low-shrink thermosetting polyester resin compositions are produced by the inclusion of a certain thermoplastic additive comprising a polymeric mixture of polyurethane and vinyl copolymer. Ethylenically unsaturated monomers are copolymerized in a hydroxyl containing polymeric diluent non-reactive with said monomers to produce a vinyl copolymer dispersed in the diluent. The unreacted hydroxyl groups on the diluent can be subsequently reacted with isocyanate materials to produce a resin mixture of polyurethane polymer intermixed with the previously formed vinyl copolymer. The polyurethane-vinyl copolymer mixture can be directly mixed with the thermosetting unsaturated polyester matrix polymer together with cross-linking vinyl monomer to produce an excellent low-shrink thermosetting polyester resin composition.

DETAILS OF THE INVENTION

The low-shrink thermosetting polyester resin mixtures of this invention comprise primarily an unsaturated thermosetting polyester polymer, reactive ethylenically unsaturated monomer such as styrene, and a thermoplastic polymer mixture of polyurethane diluent copolymer and vinyl copolymer.

In accordance with this invention, the thermoplastic polymer is produced by copolymerizing ethylenically unsaturated monomers within an organic liquid hydroxyl terminated polymeric diluent to provide a vinyl copolymer dispersed within the hydroxyl containing polymeric diluent. Suitable ethylenically unsaturated monomers which can be copolymerized to form the vinyl copolymer include, for example, butadiene, styrene, vinyl acetate, vinyl toluene, vinyl chloride, acrylamide, acrylonitrile, and lower alkyl esters of acrylic and methacrylic acid having alkyl portions of 1–6 carbon atoms such as, for example, methyl methacrylate and ethyl acrylate. The vinyl copolymer can be provided with acid groups by polymerizing unsaturated aliphatic carboxylic acids having sufficient double-bond reactivity to react with other ethylenically unsaturated monomers used in synthesizing the thermoplastic polymer. Preferred unsaturated carboxylic acids are aliphatic, monocarboxylic or dicarboxylic acids having from 3–12 carbon atoms and include, for example, monocarboxylic unsaturated acids such as acrylic and methacrylic acids and dicarboxylic unsaturated acids such as itaconic, maleic, and fumaric acid. The monomeric unsaturated carboxylic acids are copolymerized with one or more ethylenically unsaturated monomers copolymerizable with the unsaturated acids. The acid number of the vinyl copolymers can range from about 0.40 to 40, preferably between 4 and 25, and most preferably between about 10 and 25.

The preferred acid functional vinyl copolymer comprises by weight from about 5–50% of a lower alkyl ester of acrylic or methacrylic acid wherein the alkyl portion has from 1–6 carbon atoms, about 0.05–5% acrylic or 0.06 to 6% methacrylic acid, and the balance being vinyl acetate. The most preferred vinyl copolymer contains by weight between about 80% and 90% vinyl acetate, 9% and 19% butyl acrylate, and 1% and 2% acrylic or methacrylic acid.

The vinyl copolymers are produced in accordance with this invention by copolymerizing the ethylenically unsaturated monomers within polymeric diluents which are utilized as a polymerizing medium for dispersing the vinyl copolymer. The polymeric diluent is substantially non-reactive with respect to the copolymerizing reactive ethylenic monomers synthesized therein and maintains sufficiently low viscosity at the reaction temperature so as to avoid excessive viscosity build-up during the vinyl copolymer polymerization step. Ethylenically unsaturated monomers quite typically can be reacted at relatively low temperatures of between about 100° C. to 200° C., although lower temperatures of about 75° C. and higher temperatures of about 250° C. can be utilized depending upon the catalyst and/or the ethylenic monomers. Suitable polymeric diluents can be liquid or solid at room temperature and preferably include low-molecular weight linear polyethers, polyesters, and polyalkanes as well as other diluent which are compatible with the vinyl copolymer produced within the diluent. Liquid polmeric diluents have a viscosity of between about 80 and 800 centipoises at 25° C. and exhibit approximately a nuetonian decrease in viscosity at reaction temperatures of between 75° C. and 200° C. or higher. Compatibility of the low-molecular weight polymeric diluent with the vinyl copolymer is important so as to maintain a low-viscosity reaction mixture and avoid viscosity build-up during the vinyl copolymer polymerization process. The low-molecular weight polymeric diluent has number average molecular weight of between about 500 and 5,000 and contains by weight about 0.6% to 8% or more hydroxyl groups. The preferred polymeric diluent contains hydroxyl groups which are substantially non-reactive and inert with respect to the free-radical copolymerization of the ethylenically unsaturated monomers although the diluent hydroxyl groups can be post reacted with isocyanate material such as diisocyanate to produce a polyurethane copolymer of the diluent.

The polymeric diluent can be liquid or solid linear polymers selected from saturated polyester polymers and polyalkylene oxides. Saturated polyesters are saturated linear polyester polymers produced primarily by the condensation esterification reaction of a glycol with a linear aliphatic dicarboxylic acid having 4 to 10 carbon-atoms such as succinic acid, adipic acid, azelaic acid, glutaric acid, and similar aliphatic dicarboxylic acids. Suitable glycols can include ethylene glycol, propylene glycol, diethylene glycol, dipropylene glycol, tripropylene glycol, trimethylpentanediol (TMPD), 1,3- and 1,4-butylene glycol, 1,6- and 1,4- and equivalent hydroxyl groups are provided on the linear polyester polymer by providing between about 5% to 30% excess equivalent hydroxyls relative to available carboxyl group. The most preferred glycols are diethylene, dipropylene, and tripropylene glycol. Polyalkoxide polymers are polymers and copolymers of alkane oxides such as ethyl oxide, propylene oxide, and butylene oxide and similar alkyl oxides having alkyl radicals of between about 2 and 8 carbon atoms. Preferred polyalkoxide polymers are polyethylene oxide polymers and polypropylene oxide polymers.

The polymeric diluent preferably contains by weight between about 0.6% and 8% free hydroxyl groups and has a hydroxyl Number of at least about 22 and preferably between about 35 and 265. The free hydroxyls are readily reactive with isocyanate materials at relatively low temperatures of about 50° C. to 60° C. The hydroxyl terminated polymeric diluent materials are suitable reaction medium for copolymerization of the ethylenic monomers but apparently can be insufficient in molecular weight without the isocyanate addition for subsequent use in low-shrink molding resins compositions. Thus the hydroxyl containing diluent can be post reacted in accordance with this invention with lesser molar equivalents of isocyanate material and typically diisocyanates such as 2,4- and 2,6-tolylene diisocyanate as well as 4,4'- and 2,4' diisocyanate-diphenyl-methane or triisocyanates. Equal or lesser molar equivalents of isocyanate materials are utilized so as to avoid free isocyanate and preferably complete reaction of substantially all isocyanate groups.

In accordance with the process of this invention, the linear vinyl copolymer can be synthesized within the liquid polymeric diluent wherein the ethylenic monomers are continuously fed and copolymerized at a reaction temperature of at least about 75° C. and preferably between about 100° C. and 200° C. in the presence of about 0.5% to 3% by weight of a suitable peroxide or azo-catalyst based on the ethylenic monomer weight. The ethylenically unsaturated monomers are preferably fed continuously into the polymeric diluent reaction medium although step-wise and bulk additions can be utilized. The reaction mixture is maintained at reaction temperatures of between about 100° C. and 200° C. for at least about 1 hour after the conclusion of the monomer additions to insure substantially complete copolymerization of the ethylenically unsaturated monomers. Preferred catalysts are organic peroxide catalysts such as tertiary butyl perbenzoate, tertiary butyl peroctoate, benzoyl peroxide, and similar peroxide catalysts for free-radical copolymerization of ethylenically unsaturated monomers. The ratio of ethylenically unsaturated monomers to hydroxyl containing polymeric diluent can range on a weight basis from about 1.5 to 7 parts of ethylenic monomers to 1 part polymeric diluent whereby the resulting hydroxyl containing diluent and vinyl copolymer mixture ordinarily can contain by weight broadly between about 40% and 90% of vinyl copolymer and preferably between about 60% and 85% vinyl copolymer.

The resulting mixture of hydroxyl containing polymeric diluent and vinyl copolymer can be diluted in styrene and then subsequently reacted with diisocyanate such as toluene diisocyanate to provide a polyurethane-vinyl copolymer dispersed in the styrene or other suitable vinyl monomer. Lesser molar equivalents of diisocyanate are reacted with the hydroxy containing diluent at suitable reaction temperatures of between about 40° C. and 100° C. and most typically between about 50° C. and 60° C. for time sufficient to completely react all of the isocyanate groups and thus avoid unreacted isocyanate. The polyurethane copolymer of diluent contains between about 3% and 20% by weight copolymerized isocyanate reactant. Diisocyanate such as toluene diisocyanate increases the molecular weight of the hydroxyl containing diluent to form a polyurethane polymer. The polyurethane and vinyl copolymer mixture can contain on a weight basis between about 55% and 85% vinyl copolymer, and preferably between about 70% and 80% vinyl copolymer with the remainder being a polyurethane copolymer of the diluent. This thermoplastic mixture of polyurethane and vinyl copolymer can be added to a thermosetting polyester to form a low-shrink polyester system.

Referring now to the ethylenically unsaturated thermosetting polyester polymer, the unsaturated polyester polymers are obtained by the polycondensation of an alpha, beta-unsaturated dicarboxylic acid with a polyol. Examples of alpha, beta-unsaturated dicarboxylic acids include: maleic, fumaric, mesaconic, itaconic, citraconic, dimeric methacrylic acid, and similar dicarboxylic. The unsaturated dicarboxylic acids can be reacted in the anhydride form or ester form as well as the acid form. Preferably, the thermosetting polyester polymer contains only unsaturated dicarboxylic acids but can include lesser molar amounts up to about 20% molar replacement with saturated dicarboxylic acids. Examples of saturated dicarboxylic acids which can be used in such proportion include: adipic, isophthalic, orthophthalic, terephthalic, sebacic, succinic, and the like.

Polyols commonly used in forming thermosetting polyester polymers and conventionally esterified with dicarboxylic acids generally include glycols such as ethylene glycol, propylene glycol, diethylene glycol, dipropylene glycol, butanediol, hexanediol, but can include minor amounts of higher polyols such as pentaerythritol, triethylene glycol, trimethylol propane, and glycerol.

A particularly preferred thermosetting polyester is a dicyclopentadiene modified polyester disclosed in commonly assigned U.S. Pat. No. 3,883,612 and the same is incorporated herein by reference. The dicyclopentadiene-modified unsaturated polyester preferably comprises an ester copolymer of glycol, unsaturated dicarboxylic acid, and about 0.1 to 0.4 moles of dicyclopentadiene per mole of unsaturated dicarboxylic acid. The preferred DCP-modified polyester prepolymer is prepared by first charging into the reactor 2 molar equivalents of dicarboxylic unsaturated acid per molar equivalent of glycol. The glycol and dicarboxylic acid mixture is then heated and reacted at temperatures of about 290° to 310° F. until substantially all of the glycol is esterified by the excess molar equivalent of unsaturated dicarboxylic acids. Completion of the glycol esterification may be measured by the acid number of the reactants becoming essentially constant, thus indicating no additional hydroxyl groups are available for esterification. Thereafter, dicyclopentadiene is added to the reactor and reacted with the glycol-dicarboxylic acid partial polymer at temperatures of less than 320° F., and preferably at temperatures of about 290° to 310° F. After the dicyclopentadiene is completely charged to the reactor, the reactant mixture is maintained at about 308° F. until the acid number of the reactants becomes essentially constant whereby the dicyclopentadiene is preferentially esterified with available terminal acid groups of the partial polymer. Thereafter, the remainder of the glycol charge can be added to the reactor whereupon the reaction is continued at temperatures of about 390° F. to complete the formation of a DCP-terminated polyester polymer.

The glycols that may be used in synthesizing the DCP-terminated polyester polymer of this invention are conventional polyols and may include, for example: ethylene glycol, propylene glycol, diethylene glycol, dipropylene glycol, butanediol, hexanediol, pentaerythritol, triethylene glyol, trimethylol propane, glycerol, or mixtures thereof. Preferably, the glycols used in this invention are propylene glycol and/or dipropylene glycol as the major glycol component. The unsaturated dicarboxylic acid components in the DCP-polyester are β-unsaturated decarboxylic acids or anhydrides and include, for example: maleic, fumaric, mesaconic, itaconic, citraconic, and the like or mixtures thereof. Although not preferred, lesser amounts of saturated dicarboxylic acids or anhydrides may be introduced into the DCP-polyester polymer to replace a portion of the unsaturated dicarboxylic acids. Conventional saturated dicarboxylic acids include, for example, orthophthalic anhydride or acid, terephthalic acid, isophthalic acid, adipic acid, sebacic acid, succinic acid, and the like acids or anhydrides. Similarly, minor amounts of multifunctional acid such as trimellitic anhydride may be incorporated into the DCP-polyester backbone.

Ethylenically unsaturated vinyl monomers copolymerizable with unsaturated thermosetting polyester polymers are utilized to disperse or dissolve the DCP-terminated polyester polymer and form a DCP-polyester resin mixture. Such ethylenically unsaturated monomers are well known and include: styrene, methyl styrene, chlorostyrene, vinyl toluene, divinyl benzene, vinyl acetate, acrylic and methacrylic acid, lower alkyl esters of acrylic and methacrylic acid, diallyl phthalate and the like ethylenically unsaturated monomers or mixtures thereof. For reasons of efficiency and economy, the monomer most preferred in forming the low profile molding resin of this invention is styrene.

The foregoing stabilized resin emulsion desirably comprises by weight a mixture of at least about 25% thermosetting polyester polymer, about 5% to 20% of the thermoplastic polymer mixture of polyurethane and vinyl copolymer and about 40% to 60% of styrene or other ethylenically unsaturated monomer. The preferred resin mixture contains at least about 35% of said polyester, about 42% to 52% monomer, and about 10% to 15% of the polymer mixture of polyurethane and vinyl copolymer. The ratios of the polyester, monomer and thermoplastic may be varied within the scope of this invention to provide a uniform and stabilized emulsion system as hereinbefore described.

The low-shrink molding resin composition of this invention is suitable for mixing with additives known as chemical thickeners which are physically mixed into the low-shrink molding resin composition of polyester polymer, ethylenically unsaturated monomer, and thermoplastic polymer. The chemical thickeners are reactive with carboxyl groups on the thermoplastic polymer mixture of polyurethane and vinyl copolymer and generally includes Group II metal oxides, hydroxides and alkoxides. The oxides and hydroxides of alkaline earths are preferred. For reasons of efficiency and economy, calcium oxide and magnesium oxide, or the respective hydroxides, are most often employed with low-shrink molding compositions.

Catalysts and promotors often are incorporated in small amounts into thermosetting polyester resins containing ehylenically unsaturated monomer for curing or cross-linking the unsaturated polyester with the monomer. Such catalysts and promoters are well known and may be similarly utilized in this invention for curing the polyester polymer and vinyl monomer mixed with the thermoplastic polymers. Typical catalysts, for example, include organic peroxides and peracids such as tertiary butyl perbenzoate, tertiary butyl peroctoate, benzoyl peroxide and the like. Examples of conventional promoters include cobalt octoate, cobalt naphthenate, and amines such as diethylaniline. The amounts of catalysts and promotors may be varied with the molding process and similarly varied with the level and types of inhibitors utilized, in a manner well known in the art.

Fibers, fillers and pigments normally added to polyester molding resin compositions can be likewise used in formulating the molding composition of this invention. Examples include: glass fibers, chopped fibers, chalk, kaolin, asbestos, kieselguhr, calcium carbonate, talc, ceramic spheres, and quartz. Examples of pigments include cadmium yellow, carbon black, iron oxide, titanium dioxide, etc., as well as organic pigments such as the phthaloorganamine blues and greens.

The following examples are provided to illustrate the preferred embodiments of this invention and are not intended to restrict the scope thereof. All parts are parts by weight, all percentages are expressed as weight percentages, and all temperatures are in degrees Fahrenheit, unless otherwise expressly specified.

EXAMPLE I 20 weight parts of a liquid polyether diluent of polypropylene glycol (Union Carbide PPG 1025)* were added to a flask and heated to 120° C. The ethylenically unsaturated monomer composition 80 weight parts of vinyl acetate, 20 weight parts of acrylate, 10 weight parts of acrylic acid, together with 2% benzoyl peroxide initiator, are slowly added to the polyether diluent. After all the monomer mix was added, the polymerization was continued for at least 1 hour at 120° C. until polymerization of the ethylenic monomers was essentially complete. The bulk vinyl copolymer in the polyether diluent was then reduced directly with about 130 weight parts of styrene and then post reacted with about 3.4 weight parts of toluene diisocyanate at temperatures of about 55° C.

*Physical characteristics of PPG 1025 are: Viscosity 25° is 150 centistokes, hydroxyl value is approximately 111 mg. KOH per gram, and the molecular weight is about 1018.

EXAMPLE II

The mixture of polypropylene diluent and vinyl copolymer produced in Example I was post reacted with isocyanate as follows: About 0.4% or 0.52 grams of dimethylolpropanoic acid was added directly to the mixture of diluent and vinyl copolymer to aid in uniformly mixing of styrene therein whereupon 130 weight parts of the diluent vinyl copolymer mixture was reduced in about 130 weight parts of styrene. Thereafter, about 4 weight parts of toluene diisocyanate containing about 0.05 weight parts of dibutyl tin dilaurate catalyst was added and reacted at temperature of 55° C. with the hydroxyl containing polymeric diluent to produce a polyurethane-vinyl copolymer.

EXAMPLE III

A dicyclopentadiene modified thermosetting polyester was synthesized from:
9.9 moles of propylene glycol
2.0 moles of dicyclopentadiene
10.0 moles of maleic anhydride
by processing in the manner set forth in Example I of U.S. Pat. No. 3,883,612 wherein 5 moles of propylene glycol was first reacted with the 10 moles of maleic anhydride to form an acid terminated partial copolymer. Thereafter, 2 moles of dicyclopentadiene was added while maintaining the batch reaction temperature at about 308° F. until the dicyclopentadiene was completely reacted to form a prepolymer. The prepolymer was further reacted with the remaining 4.9 moles of propylene glycol to form a DCP-terminated thermosetting polyester. The DCP-polyester was then reduced in styrene to provide a 70/30 weight ratio of polymer and styrene.

EXAMPLE IV

The polyurethane-vinyl copolymer of Example I was mixed with the DCP-polyester of Example III, together with additional styrene to provide the following resin mixture on a weight basis:
41 parts DCP-polyester polymer
13 parts polyurethane-vinyl copolymer
46 parts styrene This low-shrink molding resin composition was tested in accordance with the following test method:

TEST COMPOSITION

A bulk molding compound was prepared by mixing together in a Baker-Perkins dough mixer the following materials (parts by weight):

| | |
|---|---|
| $C_aCO_3$ | 53.0 |
| Zinc stearate | 1.5 |
| Molding resin composition of Example IV | 27.0 |
| t-Butyl perbenzoate | 0.5 |
| ¼" glass strand | 20.0 |
| $Mg(OH)_2$ | 0.5 |

The calcium carbonate and zinc stearate were first dry blended in the mixer. Then the t-butyl perbenzoate catalyst was stirred into the liquid molding resin composition and that mixture slowly added to the material in the dough mixer while mixing continued. After thorough wetting of the calcium carbonate had been achieved, the chopped glass fiber reinforcement was added and mixing was continued for about 2 minutes until the glass had been thoroughly wetted. The magnesium hydroxide thickener was then added and mixing continued for about two more minutes. The mixing period after addition of the glass was kept as short as possible, consistent with achieving wetting of the glass and uniform dispersion of the glass and thickener, so as not to cause excessive breaking of the glass into shorter strands which would contribute less reinforcement to the molded particles to be produced from the bulk molding compound. The bulk molding compound was finally discharged from the mixer and held overnight (before molding) to insure that the thickening process was substantially complete.

TEST PART

A piece was molded in the following shape: About nine inches square and ⅛ inch thick having on one of its surfaces: (1) a straight rib about ½ inch deep tapering from about 7 5/16 inches long and 9/16 inches wide at the base to about 7 3/16 inches long and ⅜ inches wide at its flat outer extremity, having rounded ends and with its longitudinal centerline about one inch from the edge of the nine-inch square; (2) an L-shaped rib about ½ inch deep with branches about 7½ inches long and 1¾ inches wide having centerlines about one inch from the edges of the 9-inch square, the long branch being parallel to the straight rib (1) above and near the opposite edge of the square, the width tapering from about 5/16 inch at the base to about ¼ inch at its flat outer extremity and having rounded ends tapered at about the same angle as the straight rib (1) above; and three circular bosses centered at about 2-inch intervals along a line about 2½ inches from the edge of the square adjacent to the long branch of the L-shaped rib (2) above and being respectively, (a) about ½ inch deep and tapering from about 1 inch in diameter at the base to about 15/16 inch at its flat extremity, (b) about ¼ inch deep and tapering from about 1 inch in diameter at the base to about 31/32 inch at its flat extremity, and (c) about ¼ inch deep and tapering from about ⅝ inch diameter at the base to about 9/16 inch at its flat extremity, wherein all tapers were approximately flat except for 3 (c) in which the taper was more pronounced near the base and less pronounced near the extremity.

About 350 grams of the bulk molding compound from Example IV was placed as a compact mass in the steel die which had been preheated to 295° F. on the cavity side and 285° F. on the plunger side; the die was quickly closed in a press, and held closed for 2 minutes. The press was then opened and the molded piece removed from the die. An excellent low-profile molded part was produced.

EXAMPLE V

A dipropylene-adipate polymeric diluent was produced by esterifying a 5% molar excess of dipropylene glycol with adipic acid at temperatures of about 200° C. for time sufficient to react the adipic acid carboxyls with the excess hydroxyls and produce a liquid resin material having an acid number of less than 5 and a viscosity of about Z on the Gardner-Holt scale. The polymeric diluent contained approximately 58 weight parts of adipic acid and 56 weight parts of propylene glycol copolymerized. The hydroxyl value was 25 and the number average molecular weight was about 204. This dipropylene-adipate polymeric diluent was utilized as the hydroxyl containing diluent in the processing of the vinyl copolymers as set forth in Table I.

TABLE I

The vinyl copolymer synthesized in dipropylene-adipate polymeric diluent is set forth in relative weight parts of monomer feed together with benzoyl peroxide iniator based on the monomer feed. The vinyl copolymer was processed in the dipropylene-adipate polymeric diluent on the indicated weight basis relative to the monomer feed.

|   | Polymeric Diluent | Vinyl Acetate | Butyl Acrylate | Acrylic Acid | Benzoyl Peroxide | Processing Conditions |
|---|---|---|---|---|---|---|
| a) | 40 | 53.4 | 16.7 | 0.60 | 1.8% | 9 hrs. at 115° C. |
| b) | 25 | 66.7 | 7.5 | 0.75 | 1.5% | 8.5 hrs. at 115° C. |
| c) | 25 | 67 | 7.5 | 0.75 | 1.5% | 8 hrs. at 125° C. |
| d) | 25 | 64 | 10 | 1 | 1.1% | 7 hrs. at 135° C. |
| e) | 25 | 64 | 10 | 1 | 1.1% | 12 hrs. at 130° C. |
| f) | 25 | 64 | 10 | 1 | 0.75% | 8.5 hrs. at 130° C. |

Each of the diluent mixtures (thermoplastic) identified as "a" through "f" and containing the indicated vinyl copolymers dispersed therein were combined with thermosetting polyester polymer (Ex. 111) and styrene in the weight ratios of 13 parts theermoplastic, 41 parts polyester and 46 parts styrene. The mixtures were stabilized liquid resin mixtures. Each of the foregoing polymer mixtures containing polyurethane and vinyl copolymer thermoplastic additives "a" through "f" provided excellent thermoplastic additives for low-shrink compositions as tested hereinabove.

EXAMPLE VI (a) Low-shrink resin compositions were compounded in the manner set forth in Example V based upon 41 weights parts of DCP-polyester, 13 weight parts of thermoplastic polymer mixture "d", and 46 weight parts of styrene. This low-shrink resin mixture was combined with fiberglass strands so as to provide about 29% by weight glass. The resin and glass mixture was cured to form a low-profile thermoset sheet having substantially no shrinkage and no waniness.

(b) Similarly, 38 weight parts of DCP-polyester, 13 weight parts of thermoplastic polymer mixture "f" was compounded with fiberglass strands to provide a resin mixture containing about 28% fiberglass. The mixture was cured in sheet form and provided 0.0% shrinkage.

(c) A similar resin composition of 38 weight parts DCP polyester, 13 weight parts of thermoplastic polymer mixture "e", and 49 weight parts styrene was compounded with glass strands to provide a molding composition of about 29% fiberglass. Upon curing, shrinkage was essentially 0%.

(d) A composition similar to (c) hereinabove was compounded with 27.8% glass was cured into sheet form and resulted in 0.0% shrinkage.

EXAMPLE VII (a) For comparison with Example VI, ordinary 24 gauge flat steel was measured by Bendix Microrecorder and was found to have an average deviation of about 275 micro-inches.

(b) In contrast, the sheet moldings in Example VI in accordance with this invention had a molded thickness of about 0.10 inches and were all measured to have essentially neglible deviations.

(c) A standard polyester of 1.1 moles of propylene glycol, 0.5 moles of maleic anhyride, 0.5 moles of phthalic anhydride was cooked to acid number of 30 and reduced to 65% N.V.M. in styrene. The resin was compounded similarly to the test composition in Example IV without thermoplastic and molded in the mold of Test Part which produced a drastically deformed product. The same resin composition was molded in an ordinary 0.10 inch thickness flat sheet which produced deviations in excess of 1,000 micro-inches.

EXAMPLE VIII

POLYMERIC DILUENT

A hydroxyl terminated polymeric diluent was produced by esterifying at temperatures of about 400° F. a 1.05/1.00 molar ratio of propylene glycol and adipic acid as follows:

4903 grams of dipropylene glycol
5,087 grams of adipic acid
10 grams of dibutyl tin oxide The resulting polymer was a solid at room temperature and had an acid No.=4.5. For viscosity test purposes a sample was reduced in vinyl toluene and provided a Gardner-Holt viscosity of U-V at 70 percent by weight solids and a G-H viscosity (or 70-80 centipoises on Brookfield RVT No. 2 spindle at 100 RPM, 77° F.) at 40 percent by weight solids. The hydroxyl number of the polymeric diluent was 26.7 and the average number molecular weight was approximately 1940 and the weight average molecular weight was approximately 3800.

VINYL COPOLYMER

The foregoing dipropylene-adipate solid polymeric diluent was first melted in a reaction vessel followed by copolymerization of vinyl and acrylic monomers therein to produce a vinyl copolymer in accordance with the following weights:

5,000 grams solid dipropylene-adipate polyester (diluent)
250 grams acrylic acid
3,000 grams butyl acrylate
16,500 grams vinyl acetate
150 grams benzoyl peroxide The diluent was charged to the reactor and heated under agitation and inert $N_2$ blanket up to 260° F. The mixture of vinyl and acrylic monomers containing the peroxide catalyst was then added gradually to the reactor at the rate of about 42 milliters per minute over a period of about eight hours while maintaining the reaction temperature between about 270° F.–280° F. and gradually gaining 340° F. over the last two hours. The reaction mixture was then reduced in styrene containing 31 grams p-Benzoquinone to provide 60/40 mixture of solids/styrene. The viscosity at room temperature of the 60 percent solids resin was about $Z_1$ on the Gardner-Holt scale.

The foregoing thermoplastic resin mixture was then added to the dicyclopentadiene thermosetting polyester of Example III together with additional styrene to provide a weight ratio of 41/13/46 of DCP-polyester/thermoplastic/styrene. This resin mixture provided an excellent low-shrink resin system when compounded in the manner set forth in Example IV and cured to form excellent low-profile molded parts.

EXAMPLE IX

In a manner similar to Example VIII, thermoplastic resin mixtures were produced from the following components.

|  | a | b |
| --- | --- | --- |
| Propylene-adipate polymeric diluent | 20 | 20 |
| vinyl acetate | 66.0 | 70 |
| butyl acrylate | 12.0 | 11 |
| acrylic acid | 1.0 | 1.0 |
| process temperature | 270° F. | 225° F. |
| Brookfield viscosity at 50% styrene (centipoises) | 800 cps. | 900 cps. |
| at 40% styrene (centipoises) | 220 cps. | 260 cps. |

Toluene diisocyanate was then reacted at a temperature of about 55° C. with thermoplastics (a) and (b) on a 1/1 molar basis relative to the free hydroxyls on the hydroxyl containing polymeric diluent to produce thermoplastic mixtures of vinyl copolymer and polyurethane (diluent copolymer). The thermoplastic mixtures reduced in styrene to 40% solids were measured for viscosity as follows.

|  | a | b |
| --- | --- | --- |
| viscosity at 40% solids in styrene (centipoises) | 1520 cps. | 400 cps. |

Each of the foregoing thermoplastic polymer mixtures (vinyl copolymer and polyurethane) were mixed with DCP-polyester and styrene to provide a stabilized resin mixture having a weight ratio of 40/15/45 of DCP-polyester/thermoplastic/styrene with viscosities as follows:

|  | a | b |
| --- | --- | --- |
| Brookfield Viscosity (centipoises) | 1155 cps. | 710 cps. |

Each resin mixture (a) and (b) produced excellent low-profile molded parts when tested in accordance with Example IV.

While the invention has been illustrated by the foregoing examples, it is understood that various modifications are contemplated and may be made within the scope of this invention, as defined in the following claims.

We claim:

1. A low-shrink polyester molding resin composition for thickening with Group II metal oxides, hydroxides, or alkoxides, and thermosetting to form low-profile molded structures, wherein the resin composition comprises by weight at least about 25% ethylenically unsaturated thermosetting polyester polymer, about 5% to 20% of an acid functional thermoplastic polymer, and about 40% to 60% of an ethylenically unsaturated monomer copolymerizable with said thermosetting polyester polymer, the improvement comprising:

said thermoplastic polymer comprising a polymer mixture of vinyl copolymer dispersed in a polymeric diluent wherein the mixture contains by weight between about 60% and 90% vinyl copolymer, said polymeric diluent having number average molecular weight of between about 500 and 5,000 and said polymeric diluent is a linear saturated polyester or polyalkylene oxide.

2. The composition in claim 1 wherein the thermosetting polyester is a dicyclopentadiene modified polyester containing 0.1 to 0.4 moles of dicyclopentadiene per mole of unsaturated dicarboxylic acid wherein the dicyclopentadiene is esterified with carboxyl groups of said dicarboxylic acid, and said composition is a stabilized resin emulsion.

3. The composition in claim 2 wherein said thermoplastic polymer mixture contains a vinyl copolymer comprising by weight between about 5% and 50% of a lower alkyl ester of acrylic acid or methacrylic acid, between 0.5% and 5% acrylic acid or 0.6% and 6% methacrylic acid, and the balance being vinyl acetate.

4. The composition in claim 2 wherein the polymeric diluent in said thermoplastic polymer mixture is a hydroxyl terminated polymeric diluent containing between about 0.6% and 8% by weight hydroxyl groups wherein said hydroxyl groups are post-reacted with isocyanate to produce a polyurethane copolymer of said polymeric diluent.

5. The composition in claim 4 wherein said polyurethane copolymer of diluent contains between about 3% and 20% by weight copolymerized isocyanate.

6. The composition in claim 4 wherein the polyurethane copolymer of diuent contains copolymerized toluene diisocyanate.

7. A method of producing a low-shrink resin composition suitable for thickening with Group II metal oxides, hydroxides, and alkoxides, and thermosetting to form a low profile molded structure, the resin mixture comprising by weight at least about 25% of a thermosetting ethylenically unsaturated polyester polymer, about 5% to 20% of an acid functional thermoplastic polymer, and about 40% to 60% of an ethylenically unsaturated monomer copolymerizable with said thermosetting polyester, the improvement comprising:

providing a thermoplastic mixture of vinyl copolymer and polymeric diluent containing by weight between about 60% and 90% of said vinyl copolymer produced by synthesizing said vinyl copolymer in said diluent as a reaction medium, said polymeric diluent having a molecular weight of between about 500 and 5,000, by heating said polymeric diluent to at least about 75° C. and copolymerizing therein ethylenically unsaturated monomers to form a vinyl copolymer dispersed in said diluent.

8. The method of claim 7 wherein the polymeric diluent is liquid and has a viscosity of between about 80 and 800 centipoises at 25° C., and is heated to between about 100° C. and 200° C. wherein said vinyl copolymer synthesized from ethylenically unsaturated monomers comprising by weight between about 5% and 50% of a lower alkyl ester of acrylic or methacrylic acid, 0.5% to 5% acrylic or 0.6% to 6% methacrylic acid, and the balance being vinyl acetate.

9. The method of claim 7 wherein the thermosetting polyester is a dicyclopentadiene terminated ethylenically unsaturated polyester polymer containing dicyclopentadiene esterified with carboxylic acid and containing between about 0.1 to 0.4 moles of dicyclopentadiene per 1 mole of dicarboxylic acid, and said resin mixture is a stabilized resin emulsion.

10. The method of claim 7 wherein the polymeric diluent is a hydroxyl terminated polymeric diluent containing between about 0.6% and 8% hydroxyl groups, and said hydroxyl terminated polymeric diluent is post-reacted with isocyanate to form a polyurethane copolymer of diluent.

11. The method of claim 7 wherein the polymeric diluent is a polyalkylene oxide polymer or a saturated polyester polymer.

12. The product produced in accordance with the method of claim 7.

* * * * *